US006490433B1

(12) United States Patent
Kawade

(10) Patent No.: US 6,490,433 B1
(45) Date of Patent: Dec. 3, 2002

(54) ELECTRON-EMITTING DEVICE MANUFACTURING METHOD AND APPARATUS, ELECTRON-EMITTING DEVICE DRIVING METHOD, AND ELECTRON-EMITTING DEVICE ADJUSTING METHOD

(75) Inventor: Hisaaki Kawade, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,033

(22) Filed: Feb. 24, 2000

(30) Foreign Application Priority Data

Feb. 25, 1999 (JP) .......................................... 11-048790
Feb. 21, 2000 (JP) ....................................... 2000-042532

(51) Int. Cl.$^7$ ................................................. H01J 9/02
(52) U.S. Cl. ........................................................ 455/6
(58) Field of Search .................................. 445/6, 24, 3

(56) References Cited

U.S. PATENT DOCUMENTS

| 5,066,883 A | 11/1991 | Yoshioka et al. ............ 313/309 |
| 5,455,597 A | 10/1995 | Nakamura et al. ............. 345/75 |
| 5,591,061 A * | 1/1997 | Ikeda et al. ..................... 445/3 |
| 5,659,329 A | 8/1997 | Yamanobe et al. ........... 345/74 |
| 6,053,791 A | 4/2000 | Fujii et al. ....................... 445/6 |
| 6,063,453 A | 5/2000 | Tomida et al. ............... 427/532 |

FOREIGN PATENT DOCUMENTS

| JP | 6-342636 | 12/1994 |
| JP | 7-235255 | 9/1995 |
| JP | 7-235275 | 9/1995 |
| JP | 9-259753 | 10/1997 |

OTHER PUBLICATIONS

A. Asai et al., "Multiple Scattering Model of Surface–Conduction Electron Emitters," SID 97 Digest, 1997. pp. 127–130.

C.A. Mead, "Operation of Tunnel–Emission Devices", Journal of Applied Physics, Apr. 1961, pp. 646–652.

M.I. Elinson et al., "The Emission of Hot Electrons and The Field Emission of Electrons From Tin Oxide", Radio Engineering and Electronic Physics, Jul. 1965, pp. 1290–1296.

H. Araki, "Electroforming and Electron Emission of Carbon Thin Films", Journal of the Vacuum, Society of Japan, 1983, pp. 22–29 (with English Abstract on p. 22).

G. Dittmer, "Electrical Conduction and Electron Emission of Discontinuous Thin Films", Thin Solid Films, 9, 1972, pp. 317–328.

M. Hartwell, "Strong Electron Emission From Patterned Tin–Indium Oxide Thin Films", IEDM, 1975, pp. 519–521.

C.A. Spindt, "Physical Properties of Thin–Film Emission Cathodes with Molybdenum Cones", J. Applied Physics, vol. 47, No. 12, Dec. 1976, pp. 5248–5263.

J. Dyke et al., "Field Emission", Advances in Electronics and Electron Physics, vol. VIII, 1956, pp. 89–185.

* cited by examiner

Primary Examiner—Kenneth J. Ramsey
(74) Attorney, Agent, or Firm—Fitzpatrick, Cella, Harper & Scinto

(57) ABSTRACT

This invention stabilizes the electron-emitting characteristics of an electron-emitting device. To stabilize the electron-emitting characteristics, a voltage of the same polarity as that of a voltage in normal driving and a voltage of an opposite polarity are applied in a high vacuum.

20 Claims, 11 Drawing Sheets

ELECTRON-EMITTING DEVICE MANUFACTURING METHOD AND APPARATUS, ELECTRON-EMITTING DEVICE DRIVING METHOD, AND ELECTRON-EMITTING DEVICE ADJUSTING METHOD

FIELD OF THE INVENTION

The present invention relates to an electron-emitting device manufacturing method and apparatus, electron-emitting device driving method, and electron-emitting device adjusting method.

BACKGROUND OF THE INVENTION

Conventionally, electron-emitting devices are mainly classified into two types of devices: thermionic and cold cathode electron-emitting devices. Known examples of the cold cathode electron-emitting devices are field emission type electron-emitting devices (to be referred to as FE type electron-emitting devices hereinafter), metal/insulator/metal type electron-emitting devices (to be referred to as MIM type electron-emitting devices hereinafter), and surface-conduction emission type electron-emitting devices. Known examples of the FE type electron-emitting devices are disclosed in W. P. Dyke and W. W. Dolan, "Field emission", Advance in Electron Physics, 8, 89 (1956) and C. A. Spindt, "PHYSICAL Properties of thin-film field emission cathodes with molybdenium cones", J. Appl. Phys., 47, 5248 (1976). A known example of the MIM type electron-emitting devices is disclosed in C. A. Mead, "Operation of Tunnel-Emission Devices", J. Appl. Phys., 32,646 (1961). A known example of the surface-conduction emission type electron-emitting devices is disclosed in, e.g., M. I. Elinson, Radio Eng. Electron Phys., 10, 1290 (1965).

The surface-conduction emission type device utilizes the phenomenon that electrons are emitted from a small-area thin film formed on a substrate by flowing a current parallel through the film surface. The surface-conduction emission type electron-emitting device includes electron-emitting devices using an $SnO_2$ thin film according to Elinson mentioned above [M. I. Elinson, Radio Eng. Electron Phys., 10, 1290, (1965)], an Au thin film [G. Dittmer, "Thin Solid Films", 9,317 (1972)], an $In_2O_3/SnO_2$ thin film [M. Hartwell and C. G. Fonstad, "IEEE Trans. ED Conf.", 519 (1975)], a carbon thin film [Hisashi Araki et al., "Vacuum", Vol. 26, No. 1, p. 22 (1983)], and the like.

The FE, MIM, and surface-conduction emission type electron-emitting devices have an advantage that many devices can be arranged on a substrate. Various image display apparatuses using these devices have been proposed.

The surface-conduction emission type electron-emitting device emits electrons from an electron-emitting portion formed in a conductive thin film by flowing a current parallel to the surface of the small-area conductive thin film formed on a substrate. Since this device has a simple structure and can be easily manufactured, many devices can be formed on a wide area, and applications to, e.g., image display apparatuses and the like have been studied. Applications of a surface-conduction emission type electron-emitting device to an image display apparatus are disclosed in U.S. Pat. No. 5,066,883 and Japanese Patent Laid-Open No. 6-342636 filed by the assignee of the present applicant. These references disclose image forming means and manufacturing methods. In an image forming means, a plurality of surface-conduction emission type electron-emitting devices are two-dimensionally arranged each of which has a pair of device electrodes formed on a substrate, a conductive film connected to the pair of device electrodes, and an electron-emitting portion formed in the conductive film. An electrical selection means is adopted to individually select electrons emitted from each electron-emitting device. An image is formed in accordance with an input signal. Japanese Patent Laid-Open No. 7-235255 filed by the assignee of the present applicant discloses the following technique. A voltage is applied to a surface-conduction emission type electron-emitting device in an organic atmosphere to deposit a deposit mainly containing carbon near an electron-emitting portion in order to improve the electron-emitting characteristics of the surface-conduction emission type electron-emitting device. According to the technique of Japanese Patent Laid-Open No. 7-235275 filed by the assignee of the present applicant, electron-emitting characteristics are stabilized by a means of setting the residual partial pressure of an organic substance to $1.3 \times 10^{-6}$ Pa or less in an environment where an electron-emitting device is formed. According to the technique of Japanese Patent Laid-Open No. 9-259753 filed by the assignee of the present applicant, a voltage pulse higher than the sum of the maximum value of a normal driving voltage and a noise voltage which may be applied to a surface-conduction emission type electron-emitting device is applied to a plurality of surface-conduction emission type electron-emitting devices arranged two-dimensionally in an atmosphere in which the partial pressure of an organic gas is $1.3 \times 10^{-6}$ Pa or less. This suppresses irreversible unstableness of an emission current caused by the temperature characteristics or disturbance of a driving circuit in normal driving, and reduces luminance irregularity.

An image display apparatus using such surface-conduction emission type electron-emitting device formed by the above method is expected to exhibit more excellent characteristics than other types of conventional image display apparatuses. For example, this image display apparatus is superior to recent popular liquid crystal display apparatuses in that it does not require a backlight because of a self-emission type and has a wide view angle.

As described above, the surface-conduction emission type electron-emitting device has a simple structure, can be easily manufactured, and exhibits excellent electron-emitting characteristics. For this reason, the electron-emitting device is suitable for constituting an image forming apparatus, such as a large-size self-emission flat display using a fluorescent substance as an image forming member. Applications to various analyzers and processors using electron sources are also expected. Considering applications to image forming apparatuses and the like, the electron-emitting device is required to stably keep emitting an expected electron beam amount. To provide image forming apparatuses and analyzers with high reliability, conventional electron-emitting devices must attain more stable electron-emitting characteristics.

SUMMARY OF THE INVENTION

It is an object of the present invention to provide a manufacturing method capable of manufacturing a preferable electron-emitting device, a manufacturing apparatus for a preferable electron-emitting device, a driving method for a preferable electron-emitting device, and an adjusting method for a preferable electron-emitting device.

It is another object of the present invention to realize stable electron-emitting characteristics in an electron-emitting device.

To achieve the above objects, an electron-emitting device manufacturing method according to the present invention has the following step.

That is, a method of manufacturing an electron-emitting device which has at least two electrodes and emits electrons by applying a voltage between the two electrodes is characterized by comprising:

the voltage application step of applying a voltage between the two electrodes constituting the electron-emitting device, the voltage application step including applying a voltage of the same polarity (to be also referred to as a positive polarity hereinafter) as a polarity of a voltage applied in normal driving, and applying a voltage of an opposite polarity to the polarity of the voltage applied in normal driving.

The magnitude of the voltage of the same polarity is preferably larger than the magnitude of the voltage applied in normal driving. The magnitude of the voltage of the opposite polarity is preferably larger than the magnitude of the voltage applied in normal driving. The magnitude of the voltage of the opposite polarity is preferably smaller than the magnitude of the voltage of the same polarity.

The voltage application step is preferably performed in a high-vacuum atmosphere. When the two electrodes have a gap therebetween, the voltage application step is preferably performed in an atmosphere in which the gap between the two electrodes is not made narrow by deposition of a substance in the atmosphere or a substance originating from the substance in the atmosphere in the voltage application step. The voltage application step is preferably performed in an atmosphere in which carbon and a carbon compound in the atmosphere have a partial pressure of not more than $1\times10^{-6}$ Pa. The voltage application step is preferably performed in substantially the same atmosphere as in normal driving.

The present invention can be most preferably adopted when the electron-emitting device manufacturing method further comprises the step of forming the two electrodes having a gap therebetween prior to the voltage application step.

The electron-emitting device manufacturing method according to the present invention can be preferably employed as a cold cathode device manufacturing method. Especially, the method of the present invention can be preferably employed as a method of manufacturing a field emission type electron-emitting device, a surface-conduction emission type electron-emitting device, or an MIM type electron-emitting device having an insulating layer between two electrodes. More particularly, the method of the present invention can be preferably employed as a method of manufacturing an electron-emitting device having a gap between two electrodes. For example, in a Spindt field emission type electron-emitting device, an emitter cone electrode and gate electrode serve as two electrodes having a gap therebetween. In a surface-conduction emission type electron-emitting device, a high-potential electrode and low-potential electrode serve as two electrodes having a gap therebetween. In the surface-conduction emission type electron-emitting device having a pair of device electrodes and a conductive film between them, the gap of the conductive film serves as the above-described gap.

For example, the surface-conduction emission type electron-emitting device is known to use a technique of executing in the manufacture a step called an activation step of depositing carbon or a carbon compound in a gap between two electrodes. This activation can form two electrodes having a gap therebetween in which a deposit is deposited.

The present invention can be especially preferably applied to this structure in which the deposit is deposited in the gap between the electrodes. When depositing the deposit uses the deposition step of depositing a substance in the atmosphere or a substance originating from the substance in the atmosphere, the voltage application step of the present invention is desirably performed after the partial pressure of the substance serving as a deposit is decreased upon the deposition step.

In the present invention, the voltage application step preferably comprises applying a pulse voltage. The present invention preferably adopts the step of applying the pulse voltage a plurality of number of times.

In the present invention, the voltage application step preferably comprises alternately applying pulses of the voltage of the same polarity and pulses of the voltage of the opposite polarity. The present invention preferably adopts the step of repeating alternate voltage application a plurality of number of times.

In the present invention, a total application time of the voltage of the positive polarity in the voltage application step is preferably not less than 500 $\mu$sec, and/or not more than 60 sec. A total application time of the voltage of the opposite polarity in the voltage application step is not more than a total application time of the voltage of the positive polarity. In this case, the total voltage application time is a total application time of pulses in application of a pulse voltage.

The present invention includes a manufacturing apparatus used in the electron-emitting device manufacturing method, and the manufacturing apparatus comprises a potential output portion for applying a voltage between the two electrodes. As the potential output portion, a power source 51 shown in FIG. 6 can be used.

The present invention incorporates an electron-emitting device driving method. That is, a method of driving an electron-emitting device which has at least two electrodes and emits electrons by applying a voltage between the two electrodes is characterized in that the electron-emitting device is manufactured or adjusted through the voltage application step of applying voltages of opposite polarities between the two electrodes constituting the electron-emitting device, wherein, in driving, a voltage of one polarity among the voltages of opposite polarities is applied between the two electrodes to perform normal driving.

The present invention incorporates an electron-emitting device adjusting method having the following step.

That is, a method of adjusting an electron-emitting device which has at least two electrodes and emits electrons by applying a voltage between the two electrodes is characterized by comprising:

the voltage application step of applying a voltage between the two electrodes constituting the electron-emitting device, the voltage application step including applying a voltage of the same polarity as a polarity of a voltage applied in normal driving, and applying a voltage of an opposite polarity to the polarity of the voltage applied in normal driving.

This adjusting method can be preferably used when a manufactured electron-emitting device is adjusted after shipping.

These driving and adjusting methods can also adopt the same conditions as described for the manufacturing method.

The present invention provides an electron-emitting device whose emission current is stable for a long time, as will be described later. By applying the present invention to the manufacture or adjustment of an image forming apparatus or the like, an image forming apparatus with high reliability can be provided.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

Figure 2A:
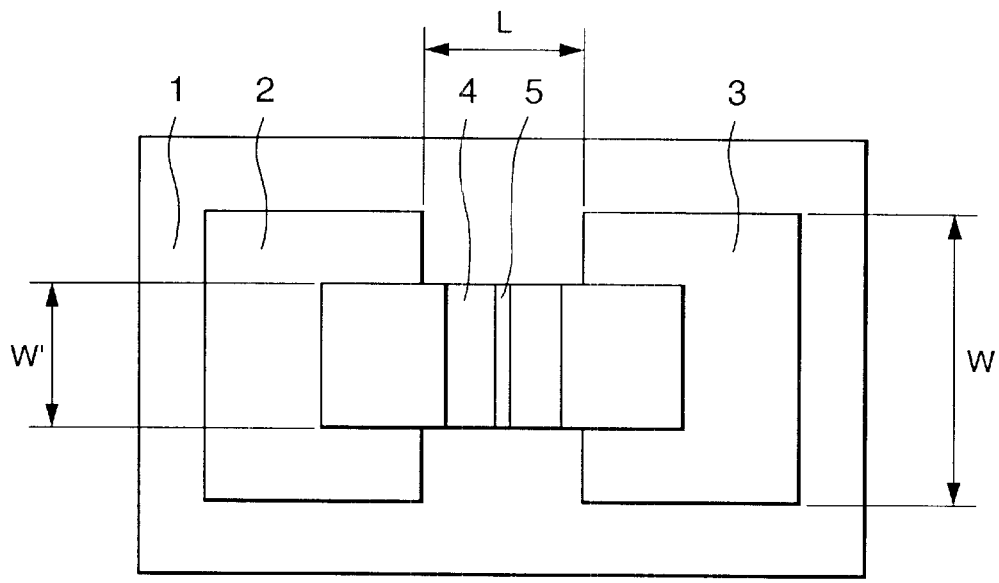
FIGS. 2A to 2C are a schematic plan view and schematic sectional views, respectively, showing electron-emitting devices to which the present invention can be applied.
Figure 2B:
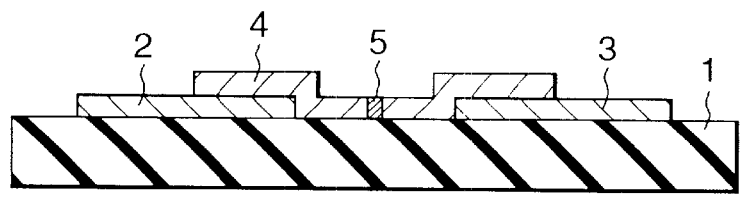
Figure 2C:
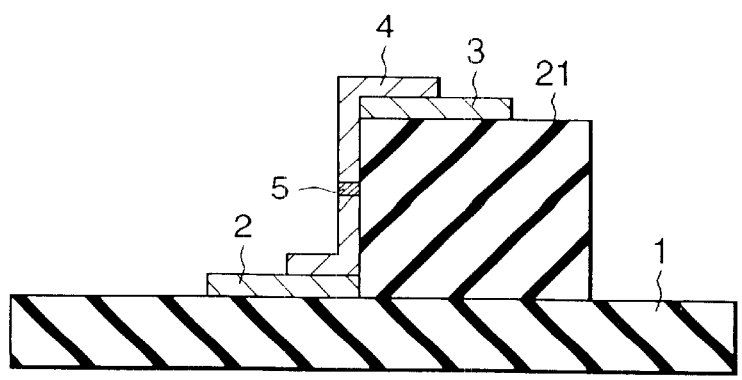

An embodiment of the present invention will be described. The electrical characteristics of a surface-conduction emission type electron-emitting device to which the present invention can be applied will be described prior to a description of an electron-emitting device manufacturing method according to the present invention. FIGS. 2A to 2C are schematic views showing typical structures of surface-conduction emission type electron-emitting devices to which the present invention can be applied. FIG. 2A is a plan view showing a flat surface-conduction emission type electron-emitting device, FIG. 2B is a sectional view showing the flat surface-conduction emission type electron-emitting device, and FIG. 2C is a sectional view showing a stepped surface-conduction emission type electron-emitting device. In FIGS. 2A to 2C, the same reference numerals denote the same parts. In FIGS. 2A to 2C, reference numeral 1 denotes an insulating substrate; 21, a step-forming member of an insulating material formed on the substrate 1; 2 and 3, device electrodes formed on the substrate 1 or step-forming portion 21; 4, a conductive film which electrically connects the device electrodes 2 and 3; and 5, a gap (electron-emitting portion) formed in the conductive film 4.

Figure 6:
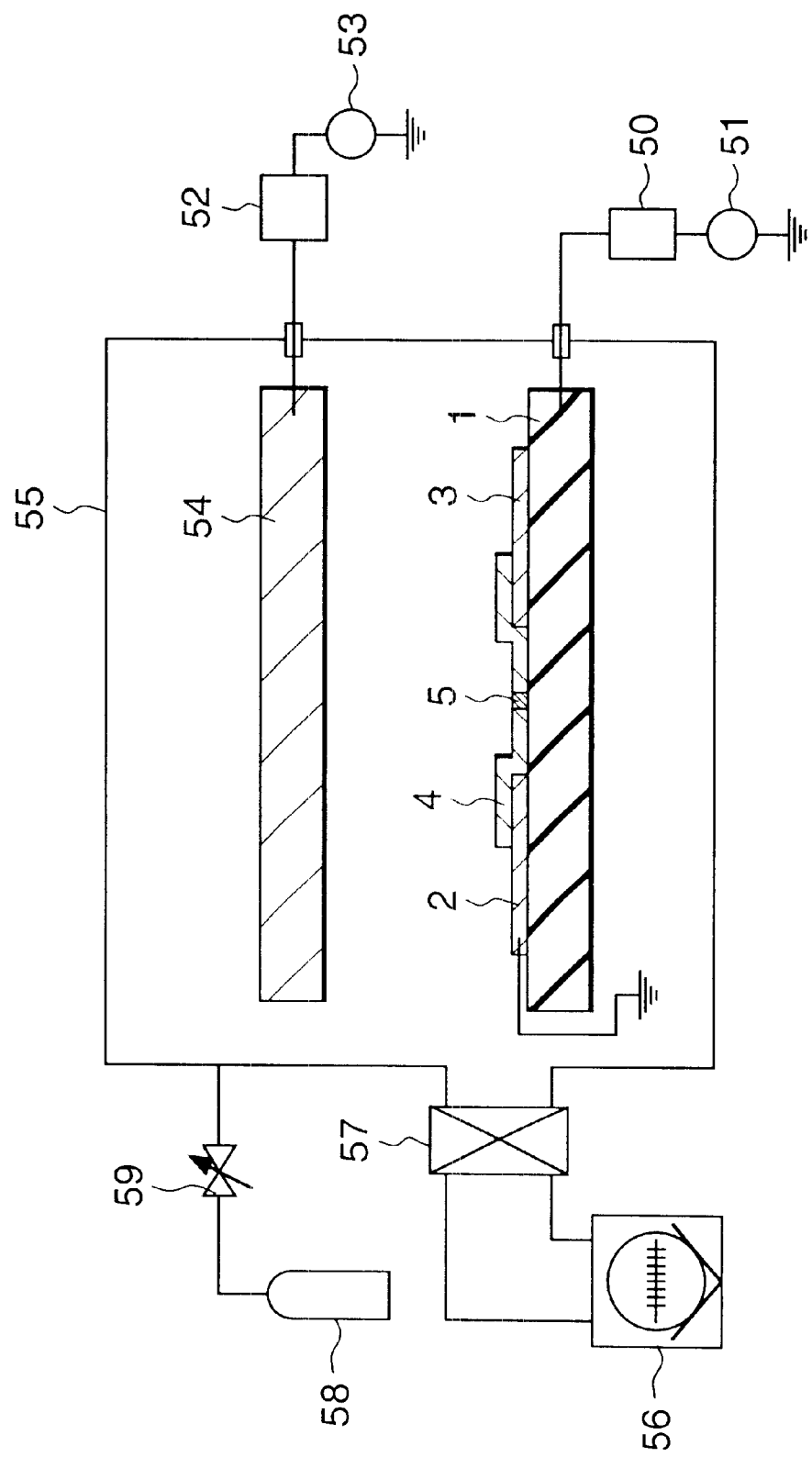
FIG. 6 is a schematic view showing an evacuation apparatus and driving/measurement apparatus used to manufacture the electron-emitting device to which the present invention can be applied, and to measure electrical characteristics.

FIG. 6 is a schematic view showing a measurement system (to be described below) for measuring the electrical characteristics of the surface-conduction emission type electron-emitting device. The same reference numerals as in FIGS. 2A to 2C denote the same parts in FIG. 6. The apparatus shown in FIG. 6 may be used in the manufacturing process (to be described later) of the surface-conduction emission type electron-emitting device. In FIG. 6, reference numeral 54 denotes an anode electrode for capturing electrons emitted by the electron-emitting portion 5; 51, a power source for generating a voltage (to be referred to as a device voltage Vf hereinafter) to be applied between the device electrodes 2 and 3; 50, an ammeter for measuring a device current If flowing between the device electrodes 2 and 3; 53, a high-voltage power source for generating a high voltage to be applied to the anode electrode 54; 52, an ammeter for measuring an emission current Ie flowing through the anode electrode 54; 55, a vacuum vessel; and 57, a gate valve interposed between the vacuum vessel 55 and a vacuum pump 56. When this measurement apparatus is used even in the activation step (to be described later), the measurement apparatus is further equipped with a container 58 for an activation substance, and a control valve 59 for controlling the supply amount of activation substance to the vacuum vessel.

The electrical characteristics of the surface-conduction emission type electron-emitting device are generally represented by the relationship between the emission current Ie and the device voltage Vf and the relationship between the device current If and the device voltage Vf. To obtain these relationships, the surface-conduction emission type electron-emitting device is placed in a vacuum environment, and the anode electrode is located 2 mm to 8 mm above the device, as shown in FIG. 6. A voltage of about 100 V to 10 kV is applied to the anode electrode, whereas the device voltage Vf is applied between the device electrodes. The device current If and emission current Ie flowing at this time are measured.

Figure 7:
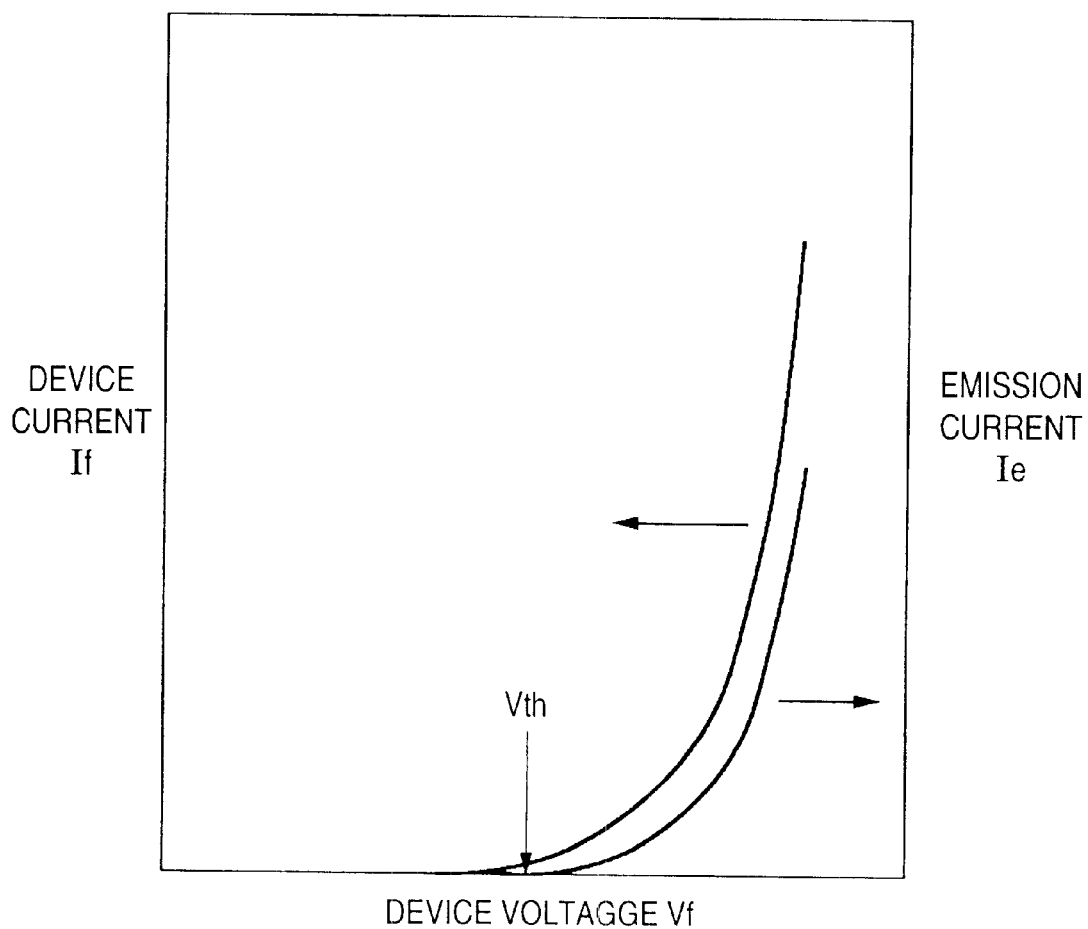
FIG. 7 is a graph showing the electrical characteristics of the electron-emitting device to which the present invention can be applied.

Representative electrical characteristics obtained in this manner are shown in FIG. 7. Since the emission current Ie is much smaller than the device current If, they are given in arbitrary units in FIG. 7. Both the ordinate and abscissa are based on linear scales. As shown in FIG. 7, if the device voltage Vf equal to or higher than a predetermined voltage (threshold voltage Vth) is applied to the surface-conduction emission type electron-emitting device, the emission current Ie abruptly monotonically increases. In a surface-conduction emission type electron-emitting device having undergone stabilization processing (to be described later), the device current If also abruptly monotonically increases with the increase in the device voltage Vf. Stabilization processing means processing of reducing the residual amount of organic gas existing in a space around the surface-conduction emission type electron-emitting device or adsorbed in the surface in order to suppress deposition of new carbon or carbon compound on or near the electron-emitting portion owing to electrification to the surface-conduction emission type electron-emitting device in activation processing (to be described later). More specifically, this processing is done by keeping evacuating the vacuum vessel while, e.g., the vacuum vessel and surface-conduction emission type electron-emitting device are heated without supplying any new organic gas.

Figure 8:
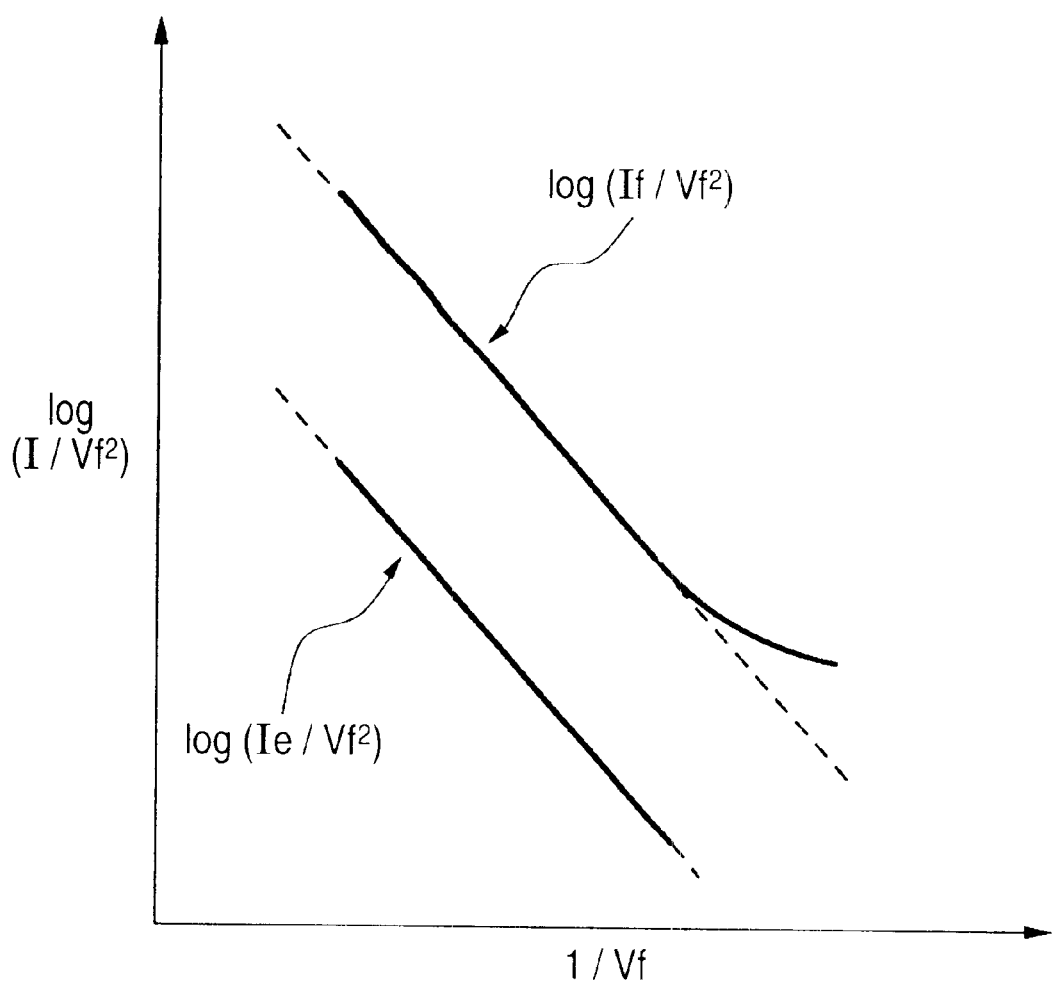
FIG. 8 is a graph showing the electrical characteristics of the electron-emitting device to which the present invention can be applied.

FIG. 8 shows another example of electrical characteristics represented by a different expression method from the method shown in FIG. 7. The expression method of the graph shown in FIG. 8 is called a Fowler-Nordhiem plot which draws an oblique straight line falling toward the right when electrons emitted by the electron-emitting device are based on field emission. The electrical characteristics of the surface-conduction emission type electron-emitting device to which the present invention can be applied are expressed by the Fowler-Nordhiem plot in FIG. 8. In this case, both the emission current Te and device current If are expressed as oblique straight lines falling toward the right. Note that the gradient of a straight line obtained from the device current and that of a straight line obtained from the emission current have almost the same value. Hence, the conduction mechanism of the device current If is considered to be based on field emission. According to A. Asai et al. [SID Intl. Symp. Digest Tech. Papers, 127 (1997)], the emission current Te reaches the anode electrode after multiple elastic scattering of part of the device current If. Thus, the emission current Ie reflects the conduction mechanism of the device current If based on field emission, and is also expressed as an oblique straight line falling toward the right by the Fowler-Nordheim plot.

Letting $\phi$ be the work function of the electron-emitting portion, the device current If based on field emission can be given by $$I_f = \frac{1.4 \times 10^{-6} \alpha \beta^2 V_f^2}{\phi} \exp\left(\frac{9.9}{\sqrt{\phi}}\right) \exp\left(-\frac{6.5 \times 10^7 \phi^{1.5}}{\beta V_f}\right) \quad (1)$$

where $\alpha$ is the electron-emitting region, and $\beta$ is the field scaling factor serving a parameter reflecting the shape near the electron-emitting portion. $\beta V_f$ corresponds to the field strength of a region where field emission occurs. By designating the work function value $\phi$, the emission region $\alpha$ and field scaling factor $\beta$ can be calculated from the gradient of the straight line and the intercept of the y-axis in FIG. 8. If the work function $\phi$ and field scaling factor $\beta$ do not change while the electron-emitting device is driven at a predetermined device voltage Vf, variations in the device current If can be regarded as variations in the emission region $\alpha$. Since the emission current Ie is part of the device current If, variations in the emission current Ie are derived from variations in the emission region $\alpha$. As will be described later, the manufacturing method of the present invention includes, as one feature, a manufacturing method of stabilizing the emission current Ie by suppressing variations in the emission region $\alpha$.

A "memory characteristic" as another characteristic of the surface-conduction emission type electron-emitting device to which the present invention can be applied will be described. The "memory characteristic" is the following characteristic. When the surface-conduction emission type electron-emitting device newly experiences a voltage larger than the maximum value of an experienced application voltage value, the electrical characteristic curves (relationship between the emission current and the driving voltage, and relationship between the device current and the driving voltage) shift to different ones, and are maintained until the device experiences a much higher driving voltage. The memory characteristic is prominent in a surface-conduction emission type electron-emitting device having undergone the above-mentioned stabilization processing. This will be explained with reference to FIG. 9.

Figure 9:
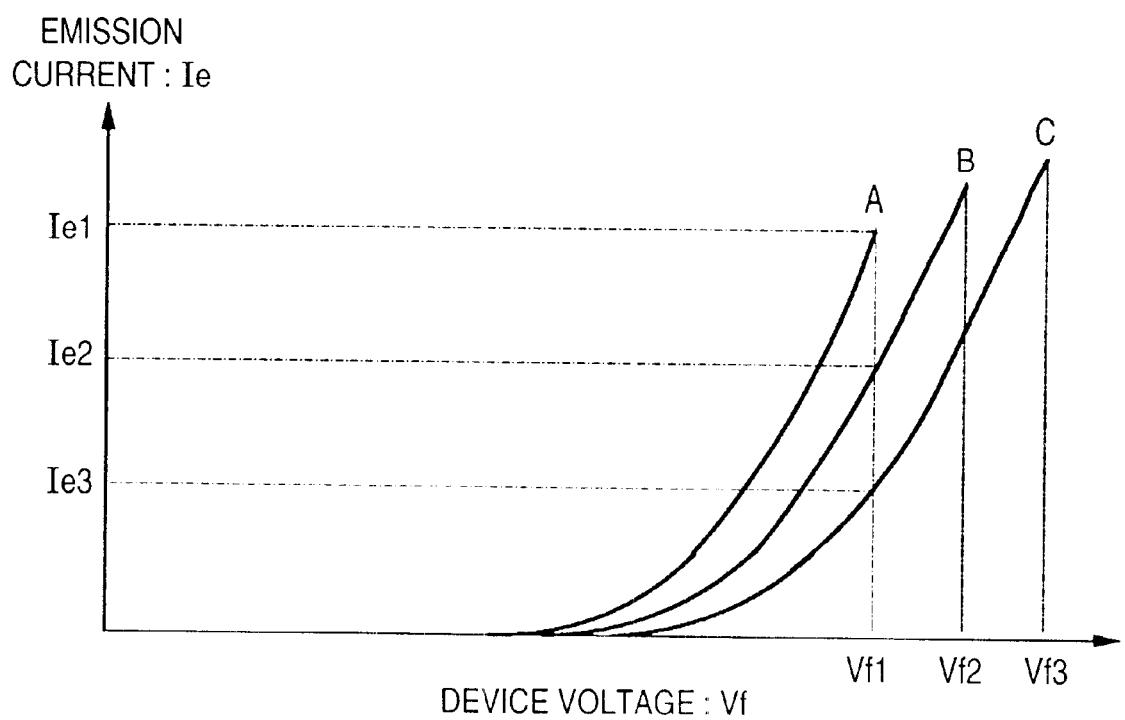
FIG. 9 is a graph for explaining the memory characteristics of the electron-emitting device to which the present invention can be applied.

FIG. 9 is a graph showing the relationship between the device voltage Vf applied to the surface-conduction emission type electron-emitting device and the emission current Ie captured by the anode electrode. The abscissa of the graph represents the device voltage Vf, and the ordinate represents the emission current Ie. An electrical characteristic curve A in FIG. 9 is a characteristic curve when the maximum value of a device voltage (to be referred to as a maximum device voltage Vmax hereinafter) first applied after stabilization processing is Vf1. A characteristic curve B is for Vmax=Vf2 (>Vf1), and a characteristic curve C is for Vmax=Vf3 (>Vf2). As shown in FIG. 9, when the application voltage is Vf1 or less for the maximum device voltage Vmax of Vf1, the relationship between the device voltage Vf and the emission current Ie is always on the characteristic curve A within a time during which deterioration over time can be ignored. However, once the maximum device voltage of Vf1 or more, e.g., Vf2 is applied, the characteristic curve shifts to B. Even if the device voltage of Vf1 or less is applied, the emission current Ie is kept smaller than the value obtained from the characteristic curve A. Further, if a higher maximum device voltage, e.g., Vf3 is applied, the characteristic curve shifts to C to exhibit the same trend. Note that the relationship between the device current If and the device voltage Vf also has the same trend.

The relationships between the device current If and the device voltage Vf corresponding to these characteristic curves A, B, and C are expressed by the Fowler-Nordheim plot, and field scaling factors $\beta_A$, $\beta_B$, and $\beta_C$ of the characteristic curves A, B, and C are calculated to obtain $\beta_A > \beta_B > \beta_C$ and $\beta_A Vf1 \approx \beta_B Vf2 \approx \beta_C Vf3$. In other words, as the maximum device voltage Vmax increases, the shape near the electron-emitting portion changes to keep the maximum field strength $\beta$ Vmax constant near the electron-emitting portion. This appears as a change in $\beta$.

In this manner, when the inexperienced maximum device voltage Vmax is first applied after the stabilization step, the shape near the electron-emitting portion changes. If the device is driven at the device voltage Vf of Vmax or less after the device experiences Vmax once, the field scaling factor $\beta$ hardly changes, and the shape near the electron-emitting portion hardly changes. Since the device is driven by a device voltage of Vf<Vmax, the field strength $\beta$Vf applied near the electron-emitting portion becomes lower than the field strength $\beta$Vmax defined in application of the maximum device voltage.

On the other hand, if a cold cathode electron-emitting device, specifically surface-conduction emission type electron-emitting device having a film of carbon or a carbon compound at the electron-emitting portion is kept driven while the maximum field strength the electron-emitting device first experiences is maintained, the electron-emitting region $\alpha$ shrinks along with driving under the influence of the strong field strength.

This shrinkage in the electron-emitting region $\alpha$ along with driving can be suppressed by driving the electron-emitting device by a field strength lower than the maximum field strength $\beta$Vmax, as well as the manufacturing method of the present invention. Accordingly, the emission current Ie can be stabilized.

In some cases, when the electron-emitting device is actually driven, ringing may occur upon application of a driving voltage pulse, or a voltage of an opposite polarity may be applied owing to external noise or the like. The periphery of the electron-emitting portion is damaged to shrink the electron-emitting region $\alpha$. As a result, the above-described memory characteristic may be lost to decrease the emission current or destruct the device.

To prevent this, the manufacturing method of the present invention applies not only a pulse voltage of a positive polarity but also a pulse voltage of an opposite polarity to that of normal driving so as to store the characteristics of a predetermined state. Even if, therefore, a voltage of an opposite polarity is applied, the device can be stably driven without changing the memory characteristic.

Figure 1:
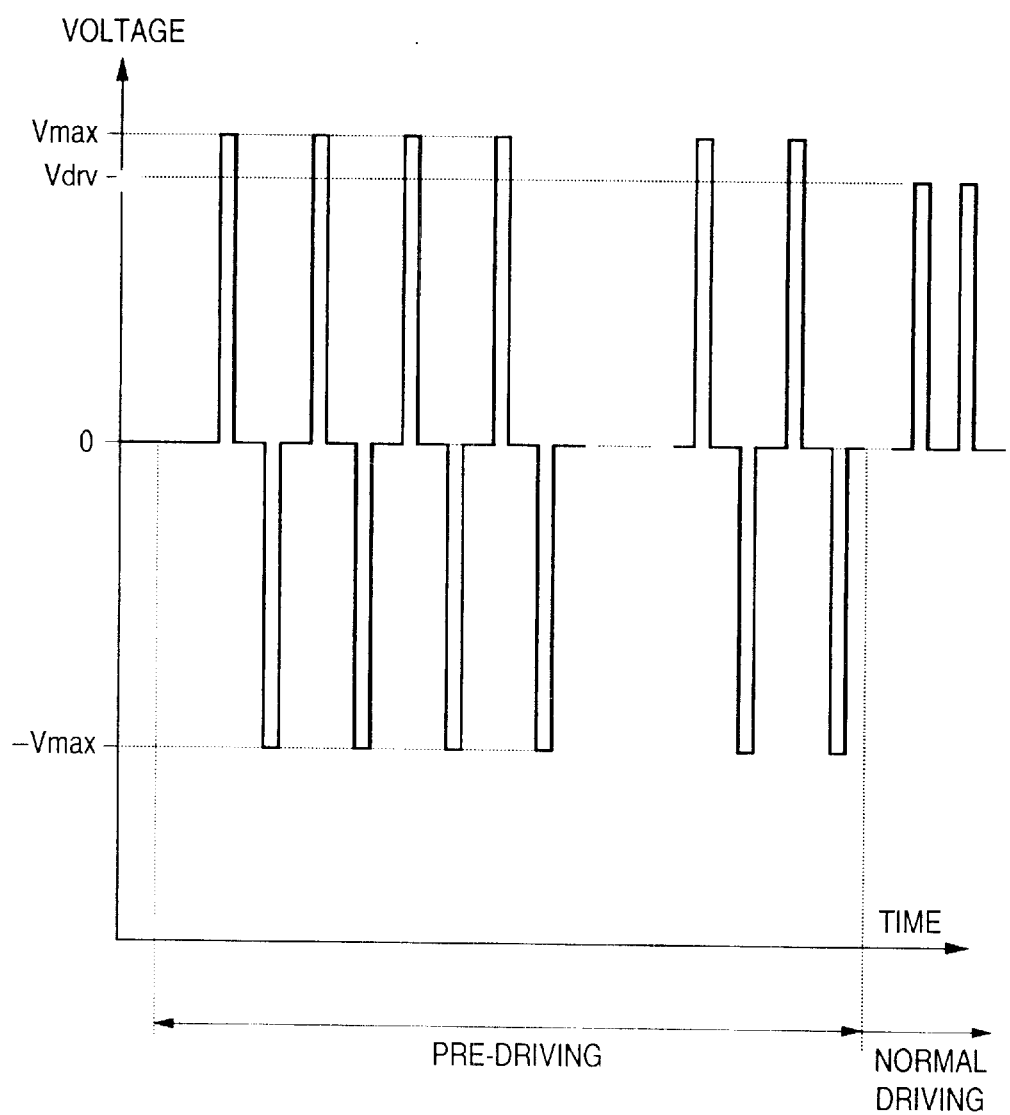
FIG. 1 is a waveform chart showing an example of a voltage pulse usable in the present invention.

The manufacturing method of the present invention will be described with reference to FIG. 1. FIG. 1 is a waveform chart showing a pulse-like voltage applied to the electron-emitting device having undergone the stabilization step prior to normal driving in an example of the manufacturing method of the present invention. As shown in FIG. 1, a positive pulse voltage having a peak value Vmax, and a negative pulse voltage having a peak value −Vmax are alternately applied once or more, and this operation is repeated. Application of the voltage pulse up to this point will be referred to as pre-driving. After pre-driving, the device is driven by a pulse having the peak value of a device voltage Vdrv which is lower than Vmax and equal to or higher than an electron-emitting threshold voltage. This enables stably emitting electrons. Note that the upper limit of the value Vmax is set not to damage the surface-conduction emission type electron-emitting device.

The total driving time at the positive pulse voltage having the peak value Vmax in pre-driving, e.g., the pulse width× the number of pulses is desirably 500 $\mu$sec or more. This setting stabilizes the emission region $\alpha$ in normal driving at the device voltage Vdrv, and stabilizes the emission current Ie. The total driving time at the peak value Vmax is preferably 60 sec or less. If the device is driven at Vmax for a longer time, the emission region $\alpha$ greatly shrinks during pre-driving to decrease the emission current Ie in normal driving. To prevent the phenomenon that the emission region $\alpha$ greatly shrinks during pre-driving to decrease the emission current Ie in normal driving, the total application time of pulses applied at the negative pulse voltage is preferably equal to or shorter than the total application time of pulses applied at the positive pulse voltage.

Figure 10:
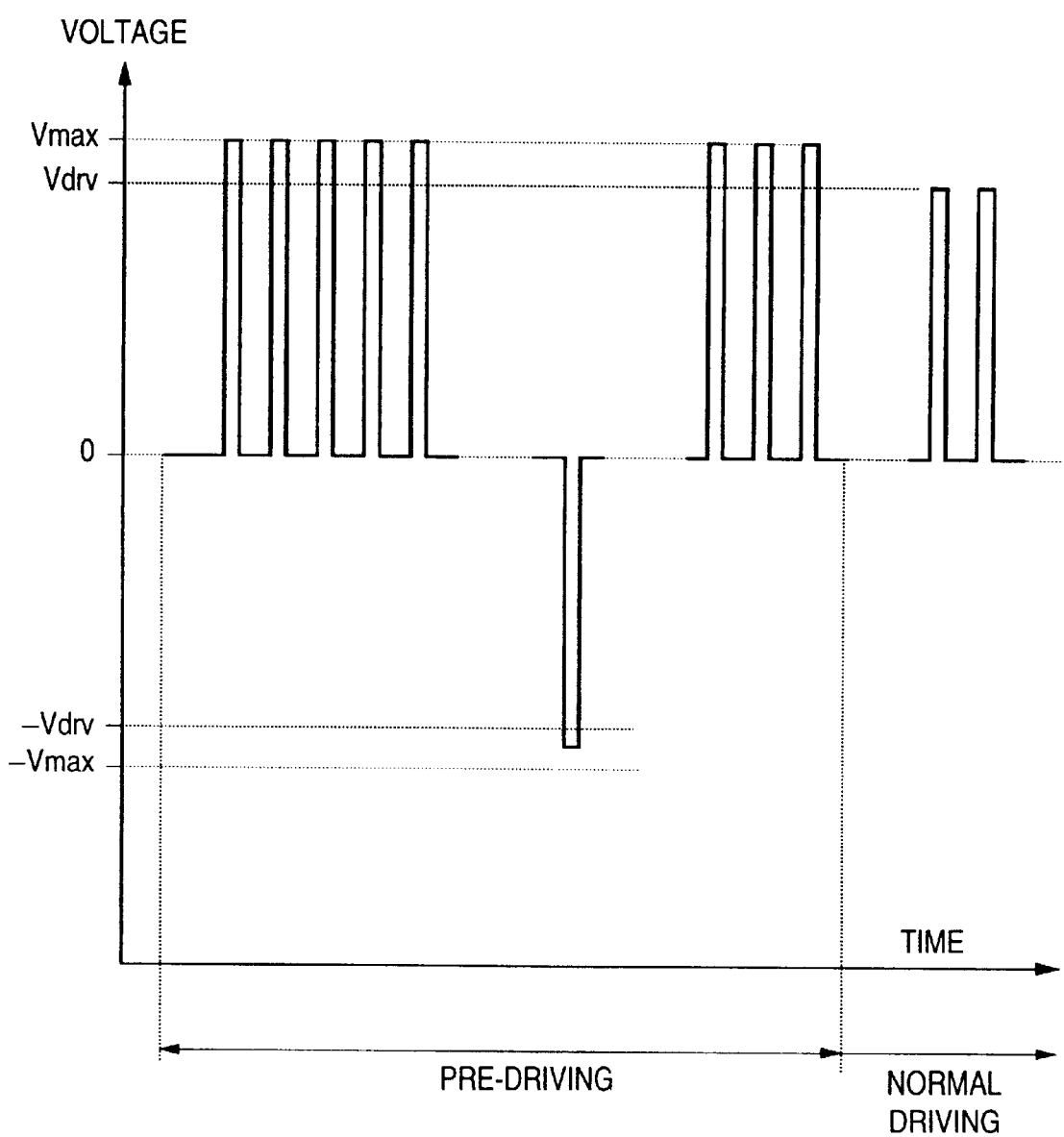
FIG. 10 is a timing chart showing another example of the voltage pulse usable in the manufacturing method of the present invention.

In FIG. 1, the positive pulse voltage having the peak value Vmax and the negative pulse voltage having the peak value −Vmax are alternately repetitively applied. However, pulse application is not limited to this as far as a negative pulse voltage having a peak value whose absolute value is larger than the device voltage Vdrv and equal to or smaller than Vmax is applied at least once during pre-driving. For example, as shown in FIG. 10, after a positive pulse voltage having the peak value Vmax is repetitively applied, a negative pulse voltage is applied, and then positive pulses are applied again.

The structure of a surface-conduction emission type electron-emitting device to which the present invention can be applied will be first described, and then an electron-emitting device manufacturing method having the pre-driving step as a feature of the present invention will be described.

<Structure and Manufacturing Method of Surface-Conduction Emission Type Electron-Emitting Device>

A surface-conduction emission type electron-emitting device to which the present invention can be applied will be explained with reference to FIGS. 2A to 2C.

The basis structures of surface-conduction type electron-emitting devices to which the present invention can be applied can be mainly classified into flat and step electron-emitting devices. First, a flat surface-conduction type electron-emitting device will be described. FIGS. 2A and 2B are a plan view and a sectional view, respectively, for explaining the structure of a flat surface-conduction emission type electron-emitting device to which the present invention can be applied. Referring to FIGS. 2A and 2B, reference numeral 1 denotes a substrate; 2 and 3, device electrodes on the substrate 1; 4, a conductive film formed between the device electrodes 2 and 3; and 5, an electron-emitting portion formed in the conductive film 4.

Examples of the substrate 1 are a quartz glass substrate, a glass substrate having a low impurity content such as Na, a soda-lime glass, a glass substrate prepared by stacking an $SiO_2$ layer on a soda-lime glass by sputtering or the like, a ceramics substrate such as an alumina substrate, an Si substrate, and the like.

The device electrodes 2 and 3 facing each other are made of a conductive material. Examples of the material are metals such as Ni, Cr, Au, Mo, W, Pt, Ti, Cu, and Pd, alloys of these metals, metals such as Pd, Ag, Au, $RuO_2$, and Pd—Ag, metal oxides of these metals, a printed conductor made of a metal oxide and glass or the like, a transparent conductor such as $In_2O_3$—$SnO_2$, and a semiconductor material such as polysilicon. An interval L between the device electrodes 2 and 3, a width W between the device electrodes 2 and 3, the shape of the conductive thin film 4, and the like are appropriately designed in accordance with an application purpose or the like. The device electrode interval L can be set within the range from several hundred nm to several hundred $\mu$m, and preferably the range from several $\mu$m to several ten $\mu$m. The device electrode width W can be set within the range from several $\mu$m to several hundred $\mu$m in consideration of the resistance value of the electrode and electron-emitting characteristics. A film thickness d of the electrodes 2 and 3 can be set within the range from several ten nm to several $\mu$m. Note that the surface-conduction type electron-emitting device is not limited to the structure shown in FIGS. 2A and 2B, and may be constituted by sequentially stacking the conductive film 4 and the facing device electrodes 2 and 3 on the substrate 1.

The conductive film 4 preferably uses a fine particle film made of fine particles in order to obtain good electron-emitting characteristics. The thickness of the conductive film 4 is properly set in consideration of step coverage for the device electrodes 2 and 3, the resistance value between the device electrodes 2 and 3, forming conditions (to be described later), and the like. This thickness is set preferably to the range from several hundred pm to several hundred nm, and more preferably to the range from 1 nm to 50 nm. A resistance value Rs is 10e2 to 10e7 $\Omega/\square$. Rs appears when a resistance R of a thin film having a thickness t, a width w, and a length L is given by R=Rs (L/w). The present specification will exemplify electrification processing for forming processing, but the forming processing is not limited to this and includes processing of forming a fissure in a film and realizing a high-resistance state. Examples of a material for the conductive film 4 are metals such as Pd, Pt, Ru, Ag, Au, Ti, In, Cu, Cr, Fe, Zn, Sn, Ta, W, and Pb, oxides such as PdO, $SnO_2$, $In_2O_3$, PbO, and $Sb_2O_3$, borides such as $HfB_2$, $ZrB_2$, $LaB_6$, $CeB_6$, $YB_4$, and $GdB_4$, carbides such as TiC, ZrC, HfC, TaC, SiC, and WC, nitrides such as TiN, ZrN and HfN, semiconductors such as Si and Ge, and carbons. The fine particle film is a film containing a plurality of fine particles. As the fine structure, individual fine particles may be dispersed, be adjacent to each other, or overlap each other (including a case in which masses of fine particles form an island structure as a whole). One fine particle has a diameter within the range from several multiples of 0.1 nm to several hundred nm, and preferably the range from 1 nm to 20 nm.

The electron-emitting portion 5 includes a high-resistance fissure formed at part of the conductive film 4. The electron-emitting portion 5 depends on the thickness, quality, and material of the conductive film 4, a forming method (to be described later), and the like. The electron-emitting portion 5 may contain conductive fine particles each having a diameter within several multiples of 0.1 nm to several ten nm. The conductive fine particles contain some or all of elements of a material forming the conductive film 4. Carbon and a carbon compound are contained in the electron-emitting portion 5 and the peripheral conductive film 4.

Next, a stepped surface-conduction type electron-emitting device will be described. FIG. 2C is a schematic view showing an example of a stepped surface-conduction type electron-emitting device which can be used for the surface-conduction type electron-emitting device of the present invention. In FIG. 2C, the same reference numerals as in FIGS. 2A and 2B denote the same parts. Reference numeral 21 denotes a step-forming member. A substrate 1, device electrodes 2 and 3, a conductive film 4, and an electron-emitting portion 5 can be made of the same materials as in the above-mentioned flat surface-conduction type electron-emitting device. The step-forming member 21 can be made of an insulating material such as $SiO_2$ formed by vacuum evaporation, printing, sputtering, and the like. The thickness of the step-forming member 21 can be set within the range from several hundred nm to several ten $\mu$m in correspondence with the device electrode interval L of the flat surface-conduction type electron-emitting device. This thickness is set in consideration of the manufacturing method of the step-forming member 21 and a voltage applied between the device electrodes 2 and 3, and preferably set within the range from several ten nm to several $\mu$m. After the device electrodes 2 and 3 and step-forming member 21 are formed, the conductive film 4 is stacked on the device electrodes 2 and 3. In FIG. 2C, the electron-emitting portion 5 is formed on the step-forming member 21. However, the electron-emitting portion 5 depends on manufacturing conditions, forming conditions, and the like, and its shape and position are not limited to those in FIG. 2C.

Figure 3A:
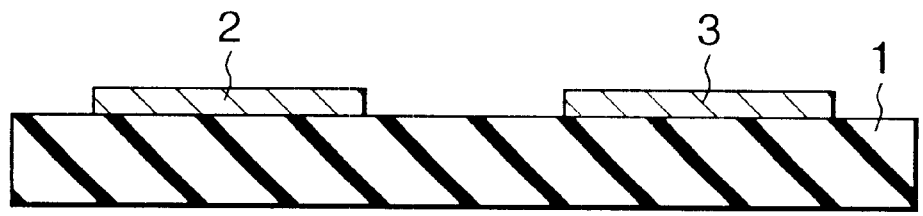
FIGS. 3A to 3C are sectional views, respectively, showing the steps in manufacturing an electron-emitting device to which the present invention can be applied.
Figure 3B:
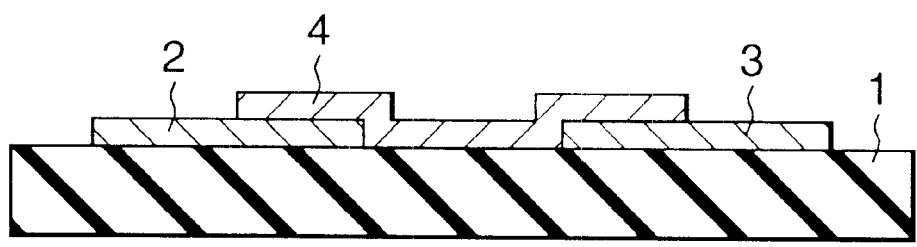
Figure 3C:
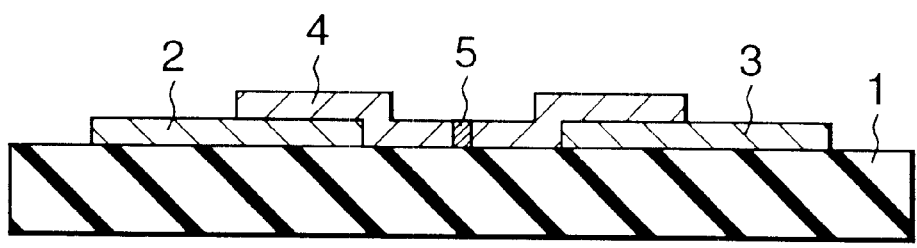

The surface-conduction type electron-emitting device can be manufactured by various methods, and an example of the methods is schematically shown in FIGS. 3A to 3C. An example of the fabrication method will be explained with reference to FIG. 2C and FIGS. 3A to 3C. Also in FIGS. 3A to 3C, the same reference numerals as in FIG. 2C denote the same parts.

(1) A substrate 1 is satisfactorily cleaned with a detergent, pure water, an organic solvent, or the like, and a device electrode material is deposited by vacuum evaporation, sputtering, or the like to form device electrodes 2 and 3 on the substrate 1 by, e.g., photolithography (FIG. 3A).

(2) The substrate 1 having the device electrodes 2 and 3 is coated with an organic metal solvent to form an organic metal thin film. As the organic metal solvent, an organic metal compound solvent containing a metal of a material for the conductive film 4 as a main element can be used. The organic metal thin film is heated, sintered, and patterned into a conductive film 4 by etching or a lift-off method using a mask corresponding to, e.g., the shape of the conductive film 4 (FIG. 3B). Although the coating method of the organic metal solvent has been exemplified, the formation method of the conductive film 4 is not limited to this and can adopt vacuum evaporation, sputtering, chemical vapor deposition, dispersion coating, dipping, spinner method, or the like. Alternatively, the conductive film 4 can be directly patterned by an ink-jet method or the like.

(3) The obtained device undergoes the forming step. As an example of the forming method, an electrification method in a vacuum vessel in FIG. 6 will be described. In FIG. 6, reference numeral 55 denotes a vacuum vessel which is evacuated through a gate valve 57 by a vacuum pump 56 such as a turbo molecular pump, sputter-ion pump, or cryopump. If necessary, the vacuum pump 56 is connected to an auxiliary pump such as a scroll pump, rotary pump, or sorption pump. Reference numeral 58 denotes a container for containing activation gas used in the activation step (to be described below). The container 58 is connected to the vacuum vessel 55 through an adjustment valve 59 such as a variable-leakage valve or needle valve. The device electrodes 2 and 3 are connected to a voltage application means. For example, as shown in FIG. 6, the device electrode 2 is connected to a ground potential, and the device electrode 3 is connected to a power source 51 through a current supply terminal. To monitor a current value flowing between the device electrodes 2 and 3, an ammeter 50 is connected. Reference numeral 54 denotes an anode electrode used in a subsequent step. The anode electrode 54 is connected to a high-voltage power source 53 through an ammeter 52.

Forming processing is executed by evacuating the vacuum vessel 55, and supplying power between the device electrodes 2 and 3 using the power source 51. As a result, an electron-emitting portion 5 having a changed structure is formed at a portion of the conductive film 4 (FIG. 3C). According to forming processing, the electron-emitting portion 5, which is a structure-changed portion such as a locally destructed, deformed, or quality-changed portion, is formed in the conductive film 4.

Figure 4A:
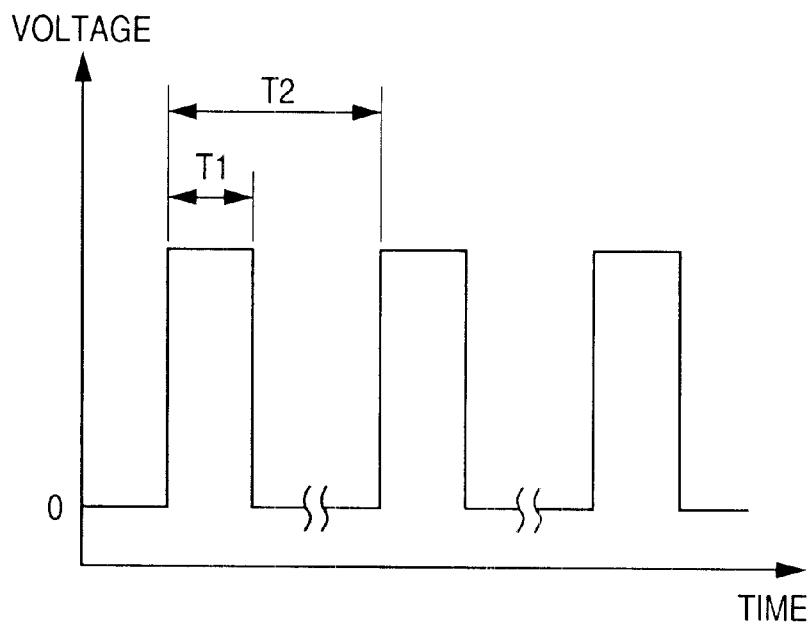
FIGS. 4A and 4B are waveform charts each showing a voltage pulse used during the forming step of the electron-emitting device to which the present invention can be applied.
Figure 4B:
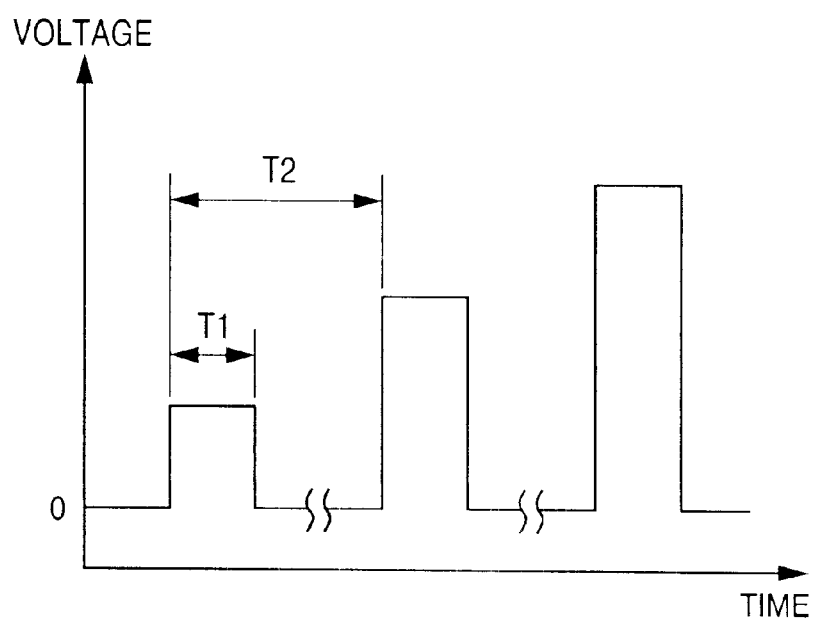

FIGS. 4A and 4B show examples of a voltage waveform applied in forming processing. As shown in FIGS. 4A and 4B, this voltage waveform is preferably a pulse waveform. Pulses can be applied by a method, FIG. 4A, of successively applying pulses whose peak value is a constant voltage, or a method, FIG. 4B, of applying voltage pulses while increasing the pulse peak value. T1 and T2 in FIG. 4A represent the pulse width and interval of the voltage waveform, respectively. In general, T1 is set within the range from 1 $\mu$sec to 10 msec, and T1 is set within the range from 10 $\mu$sec to 10 msec. The pulse peak value is appropriately selected in accordance with the shape of the surface-conduction type electron-emitting device. Under these conditions, the voltage is applied for, e.g., several sec to several ten sec. The pulse waveform is not limited to a rectangular waveform and can be a desired waveform such as a triangular waveform. T1 and T2 in FIG. 4B can be defined similarly to FIG. 4A. The pulse peak value can be incremented every step of, e.g., about 0.1 V.

The end of forming processing can be determined by detecting a change in resistance value caused when, e.g., the conductive film 4 is locally destructed or deformed. For example, the end of forming processing can be detected by applying a voltage so as not to locally destruct or deform the conductive film 4 during the pulse interval T2 and measuring the current. A device current flowing upon application of a voltage of about 0.1 V is measured to obtain the resistance value, and when the resistance value exhibits 1 M$\Omega$ or more, forming processing ends.

(4) The device having undergone forming processing is preferably subjected to processing called the activation step. In the activation step, the device current If and emission current Ie greatly change. Similar to forming processing, the activation step is executed by repeatedly applying pulses in an atmosphere containing an organic substance gas. The pulse voltage can use positive and negative voltage pulses like the ones shown in FIG. 5, in addition to voltage pulses like the ones shown in FIG. 4A. The atmosphere in the vacuum vessel in the activation step can be prepared using an organic gas left in an atmosphere when the vacuum vessel is evacuated with an oil diffusion pump, rotary pump, or the like, or using a proper organic substance gas introduced into a vacuum in the vacuum vessel temporarily sufficiently evacuated by an ion pump or the like. The gas pressure of a preferable organic substance changes depending on the application purpose, the shape of the vacuum vessel, the kind of organic substance, and the like, and thus is appropriately set in accordance with them.

Examples of the proper organic substance are aliphatic hydrocarbons such as alkane, alkene, alkyne, aromatic hydrocarbons, alcohols, aldehydes, ketones, amines, phenol, and organic acids such as carboxylic acid and sulfonic acid. Detailed examples are saturated hydrocarbons such as methane, ethane, and propane, unsaturated hydrocarbons such as ethylene and propylene, butadiene, n-hexane, 1-hexane, benzene, toluene, ortho-xylene, benzonitrile, trinitrile, chloroethylene, trichloroethylene, methanol, ethanol, isopropanol, formaldehyde, acetaldehyde, acetone, methyl ethyl ketone, diethyl ketone, methyl amine, ethyl amine, acetic acid, and propionic acid, and a mixture of these materials.

By activation processing, carbon or a carbon compound is deposited on the device from the organic substance present in the atmosphere to greatly change the device current If and emission current Ie. The end of the activation step is determined while the device current If and emission current Ie are measured. Note that the pulse width, pulse interval, pulse peak value, and the like are appropriately set.

(5) The electron-emitting device obtained by these steps is desirably subjected to the stabilization step. In this step, the organic substance in the vacuum vessel is exhausted. An evacuation apparatus for evacuating the vacuum vessel is preferably one not using any oil so as not to affect device characteristics by an organic substance such as oil produced by the apparatus. For example, this evacuation apparatus is a magnetic levitation type turbo molecular pump, cryopump, sorption pump, ion pump, or the like.

When the activation step uses an oil diffusion pump or rotary pump as an exhaust device, and uses an organic gas originating from an oil component produced by the pump, the partial pressure of the component must be suppressed as low as possible. The partial pressure of the organic component in the vacuum vessel is preferably $1 \times 10^{-6}$ Pa or less, and more preferably $1 \times 10^{-8}$ Pa or less so as not to newly deposit any carbon or carbon compound. In evacuating the vacuum vessel, the whole vacuum vessel is preferably heated to facilitate exhaustion of organic substance molecules attached to the inner wall of the vacuum vessel and the electron-emitting device. This heating is desirably done at a temperature of 80 to 250° C. and preferably 150° C. or more for a time as long as possible. However, the heating conditions are not particularly limited to them. Heating is performed under conditions properly selected in consideration of various conditions such as the size and shape of the vacuum vessel and the structure of the electron-emitting device. The internal pressure of the vacuum vessel must be minimized, and is preferably $1 \times 10^{-5}$ Pa or less, and more preferably $1 \times 10^{-6}$ Pa or less.

A driving atmosphere after the stabilization step preferably maintains an atmosphere at the end of the stabilization step, but is not limited to this. As far as the organic substance is satisfactorily removed, stable characteristics can be maintained to a certain degree even if the pressure of the vacuum vessel slightly rises.

By adopting such vacuum atmosphere, deposition of new carbon or carbon compound can be suppressed, and $H_2O$ and $O_2$ attached to the vacuum vessel and substrate can be removed. As a result, the device current If and emission current Ie relatively stabilize.

(6) After the stabilization step, the pre-driving step is executed in which the above-described pre-driving voltage pulses are applied between the device electrodes 2 and 3.

Consequently, the manufacturing process of the surface-conduction emission type electron-emitting device to which the present invention can be applied ends. The device voltage Vdrv equal to or lower than Vmax applied in the pre-driving step is applied between the device electrodes 2 and 3 of the completed electron-emitting device. Further, a high voltage is applied using the high-voltage power source 53 to the anode electrode 54 arranged above the electron-emitting device. The device can achieve stable electron emission.

EXAMPLES

Examples of the present invention will be described. However, the present invention is not limited to these examples, and incorporates replacement of respective elements and design change as far as the object of the present invention is achieved.

Example 1

In Example 1, the manufacturing method of the present invention is applied to a surface-conduction emission type electron-emitting device having the same structure as that schematically shown in FIGS. 2A to 2C. Example 1 will be explained with reference to FIGS. 3A to 3C.

A quartz substrate 1 was cleaned, and Ti and Pt were deposited on the substrate 1 to thicknesses of 5 nm and 50 nm, respectively. A photoresist was applied to the deposition film to form a pattern conforming to a pair of device electrodes 2 and 3. Pt and T1 were etched away from unwanted portions, and the resist was removed to form device electrodes 2 and 3 like the ones shown in FIG. 3A on the substrate 1. Note that an interval L between the device electrodes 2 and 3 was 3 $\mu$m, and a length W of each device electrode 2 or 3 was 500 $\mu$m.

A 50-nm thick Cr film was deposited by vacuum deposition on the substrate 1 having the device electrodes 2 and 3. An opening corresponding to the prospective formation portion of a conductive film was formed in the Cr film by photolithography. An organic Pd compound solution (ccp-4230: available from Okuno Seiyaku KK) was applied, and the resultant structure was heated in atmosphere at 300° C. The Cr film was wet-etched. The structure was cleaned with pure water and dried to form a conductive film 4 like the one shown in FIG. 3B.

In the following steps, the electron-emitting device during the manufacturing process was set in a vacuum vessel 55, and electrically connected, as shown in FIG. 6. More specifically, the device electrode 2 was connected to the ground potential, and the device electrode 3 was connected to an ammeter 50 and device voltage power source 51 through a current supply terminal. An anode electrode 54 was arranged 5 mm above the substrate 1. The anode electrode 54 was connected to an ammeter 52 and high-voltage power source 53 through a current supply terminal.

The vacuum vessel 55 was evacuated to about $1 \times 10^{-3}$ Pa or less using a scroll pump (not shown) and a magnetic levitation type turbo molecular pump 56. A voltage generated by the device voltage power source 51 was applied to the device electrode 3 to perform forming processing, thereby forming an electron-emitting portion 5. The applied voltage was a pulse-like voltage as shown in FIG. 4B, which asymptotically increased its peak value with the lapse of time. The pulse width T1 was 1 msec, and the pulse interval T2 was 16.7 msec. When the pulse peak value reached 5 V during forming processing, a current value flowing through the ammeter 50 greatly decreased. The pulse voltage was kept applied until the pulse peak value reached 5.5 V. After that, application of the voltage was stopped. The resistance value between the device electrodes 2 and 3 was measured to exhibit 1 MΩ or more. Thus, forming processing ended. This step formed a gap (electron-emitting portion) in the conductive film.

Figure 5:
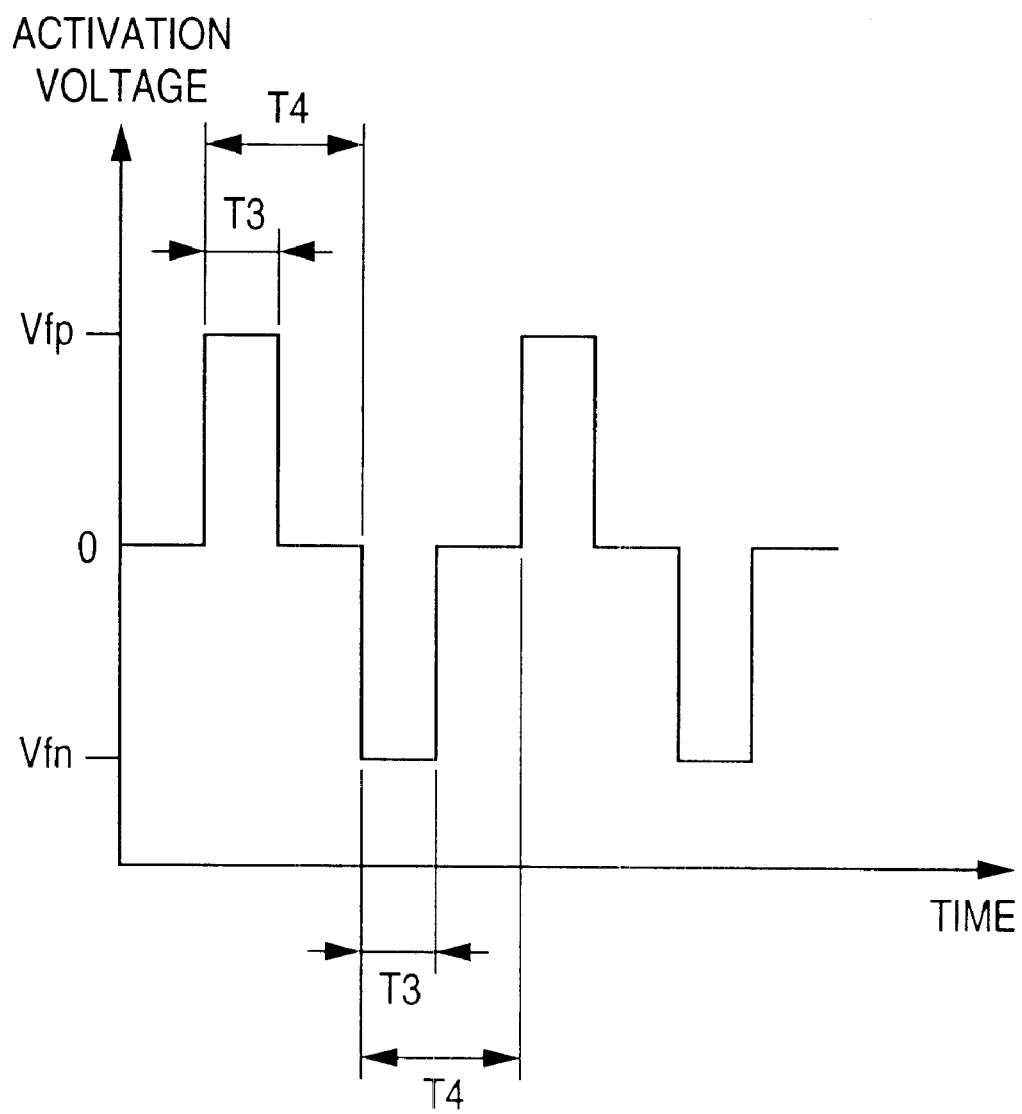
FIG. 5 is a waveform chart showing a voltage pulse used during the activation step of the electron-emitting device to which the present invention can be applied.

The vacuum vessel 55 was kept evacuated to decrease its internal pressure to $10^{-6}$ Pa or less. A slow-leakage valve 59 was adjusted to introduce benzonitrile gas from an activation gas container 58 to the vacuum vessel 55, thereby performing the activation step. In the activation step, the internal pressure of the vacuum vessel 55 containing the activation gas was adjusted to $10^{-4}$ Pa, and a voltage generated by the device voltage power source 51 was applied to the device electrode 3. The applied voltage was a voltage of positive and negative pulses, as shown in FIG. 5. The peak values Vfp and Vfn of these pulses had the same absolute value, and were constant. The pulse peak value was 16 V, the pulse width T3 was 1 msec, and the pulse interval T4 was 16.7 msec. After activation processing continued 1 hr, application of the voltage was stopped, introduction of the activation gas was stopped, and the activation gas was exhausted from the vacuum vessel 55.

The whole vacuum vessel 55 and electron-emitting device were temporarily heated to 250° C. for 10 hrs using a heater (not shown). The vacuum vessel was kept evacuated to set the internal pressure of the vacuum vessel at room temperature to about $1 \times 10^{-8}$ Pa.

After the internal pressure of the vacuum vessel was adjusted, pre-driving as the feature of the manufacturing method according to the present invention was performed. The pulse voltage waveform in pre-driving is shown in FIG. 1. The device voltage Vdrv in FIG. 1 is 15 V, and Vmax is 16 V. That is, the peak value of the positive pulse voltage was 16 V, and that of the negative pulse was −16V. The pulse width of each pulse was 100 μsec, and the pulse interval between the positive and negative pulses was 100 msec. The positive pulse voltage was applied five times to pre-drive the device. Then, the device voltage Vf was set to Vdrv (=15 V) to drive the device.

As a comparative example, an electron-emitting device formed by the same manufacturing method was driven by setting the driving voltage to 15 V from the first without pre-driving the device. The device of the comparative example was compared with the device of Example 1 to find that the pre-driven device of Example 1 hardly decreased and changed its emission current and device current during driving, and obtained more stable electron-emitting characteristics, compared to the device of the comparative example that was not pre-driven.

Negative voltage pulses having a peak value of −10 V were intentionally applied during driving to the electron-emitting devices of Example 1 and the comparative example. After that, the devices were driven again at a device voltage of 15 V. As a result, the pre-driven device of Example 1 hardly decreased its emission current and device current and obtained more stable electron-emitting characteristics, compared to the device of the comparative example that was not pre-driven.

For the electron-emitting devices of Example 1 and the comparative example, the emission region α and field scaling factor β were observed from the electrical characteristics of the device current during driving. In the pre-driven electron-emitting device of Example 1, the emission region α and field scaling factor β hardly varied and were stable during the driving period. Particularly, stableness of the emission region α was superior to that of the electron-emitting device of the comparative example that was not pre-driven.

Example 2

Figure 11:
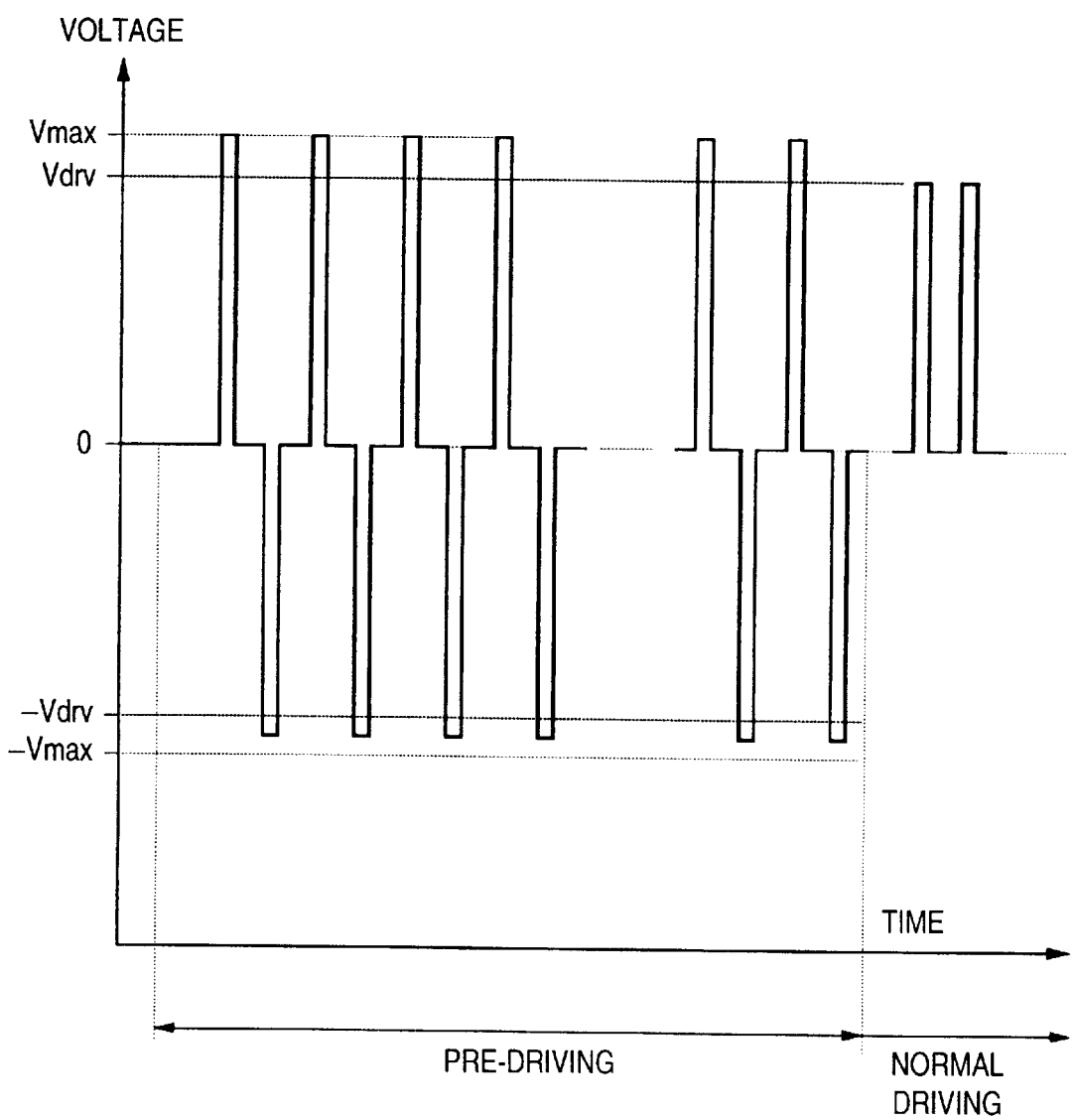
FIG. 11 is a timing chart showing still another example of the voltage pulse usable in the manufacturing method of the present invention.

An electron-emitting device was formed and driven similarly to Example 1 except that the peak value of the pulse voltage applied in the activation step was set to 15 V, and the device was pre-driven by a different method. FIG. 11 shows a pulse voltage waveform in pre-driving adopted in Example 2. In FIG. 11, the peak value Vmax of a positive pulse voltage was 16 V, the pulse width was 1 msec, and the pulse interval was 10 msec. The peak value −Vmax of a negative pulse voltage was −15.5 V, the pulse width was 1 msec, and the pulse interval was 10 msec. In Example 2, positive and negative pulses were alternately applied to pre-drive the device. The positive pulse voltage was applied a total of 60,000 times, and the total application time of the pulse voltage was 60 sec. Then, the device voltage Vf was set to Vdrv (=15 V) to drive the device.

As a comparative example, an electron-emitting device formed by the same manufacturing method was driven by setting the driving voltage to 15 V from the first without pre-driving the device. Similar to Example 1, a negative voltage was also applied during driving. As a result, the pre-driven device of Example 2 hardly decreased and changed its emission current and device current during driving, and obtained more stable electron-emitting characteristics, compared to the device of the comparative example that was not pre-driven.

For the electron-emitting devices of Example 2 and the comparative example, the emission region α and field scaling factor β were observed from the electrical characteristics of the device current during driving. In the pre-driven electron-emitting device of Example 2, the emission region α and field scaling factor β hardly varied and were stable during the driving period. Particularly, stableness of the emission region α was superior to that of the electron-emitting device of the comparative example.

Example 3

An electron-emitting device was formed and driven similarly to Example 1 except that the peak value of the pulse voltage applied in the activation step was set to 15 V, and the device was pre-driven by a different method. FIG. 10 shows a pulse voltage waveform in pre-driving adopted in Example 3. In Example 3, the device was pre-driven by repeating the step of applying a positive pulse voltage 10 times and then applying a negative pulse voltage once, instead of alternately repetitively applying positive and negative pulse voltages. In FIG. 10, the peak value Vmax of the positive pulse voltage was 16 V, the pulse width was 1 msec, and the pulse interval was 10 msec. The peak value −Vmax of the negative pulse voltage was −15.5 V, the pulse width was 1 msec, and the pulse interval was 10 msec. The positive pulse voltage was applied a total of 60,000 times, and the total application time of the pulse voltage was 60 sec. Then, the device voltage Vf was set to Vdrv (=15 V) to drive the device. As a comparative example, an electron-emitting device formed by the same manufacturing method was driven by setting the driving voltage to 15 V from the first without pre-driving the device. Similar to Example 1, a negative voltage was also applied during driving.

As a result, the pre-driven device of Example 3 hardly decreased and changed its emission current and device current during driving, and obtained more stable electron-emitting characteristics, compared to the device of the comparative example that was not pre-driven.

For the electron-emitting devices of Example 3 and the comparative example, the emission region α and field scaling factor β were observed from the electrical characteristics of the device current during driving of the electron-emitting device. In the pre-driven electron-emitting device of Example 3, the emission region α and field scaling factor β hardly varied and were stable during the driving period. Particularly, stableness of the emission region α was superior to that of the electron-emitting device of the comparative example.

According to the above examples, the electron-emitting device receives a positive pulse voltage having a larger peak value than the peak value of a pulse voltage applied in normal driving. In addition, the electron-emitting device receives a negative pulse voltage opposite to that in normal driving. This can stabilize the emission current from the electron-emitting device for a long period.

The present invention can realize a preferable electron-emitting device manufacturing method and adjusting method.

The present invention can realize a preferable electron-emitting device manufacturing apparatus.

The present invention can realize a preferable electron-emitting device driving method.

As many apparently widely different embodiments of the present invention can be made without departing from the spirit and scope thereof, it is to be understood that the invention is not limited to the specific embodiments thereof except as defined in the appended claims.

What is claimed is:

1. A method of manufacturing an electron-emitting device which has at least two electrodes and emits electrons by applying a voltage between the two electrodes, the method comprising the steps of:

a voltage application step of applying a voltage between the at least two electrodes of the electron-emitting device, said voltage application step including applying a voltage of the same polarity as a polarity of a voltage applied in normal driving, and applying a voltage of an opposite polarity to the polarity of the voltage applied in normal driving, wherein said voltage application step is performed in an atmosphere in which carbon and a carbon compound in the atmosphere have a partial pressure of not more than $1 \times 10^{-6}$ Pa.

2. The electron-emitting device manufacturing method according to claim 1, wherein a magnitude of the voltage of the same polarity is larger than a magnitude of the voltage applied in normal driving.

3. The electron-emitting device manufacturing method according to claim 1, wherein a magnitude of the voltage of the opposite polarity is larger than a magnitude of the voltage applied in normal driving.

4. The electron-emitting device manufacturing method according to claim 1, wherein the two electrodes have a gap therebetween.

5. The electron-emitting device manufacturing method according to claim 4, wherein the gap contains carbon or a carbon compound.

6. The electron-emitting device manufacturing method according to claim 1, further comprising the step of forming the two electrodes having a gap therebetween prior to the voltage application step.

7. The electron-emitting device manufacturing method according to claim 1, further comprising the step of forming the two electrodes having a gap therebetween in which a deposit is deposited, prior to the voltage application step.

8. The electron-emitting device manufacturing method according to claim 1, wherein the voltage application step comprises applying a pulse voltage.

9. The electron-emitting device manufacturing method according to claim 8, wherein the voltage application step comprises applying the pulse voltage a plurality of number of times.

10. The electron-emitting device manufacturing method according to claim 1, wherein the voltage application step comprises alternately applying pulses of the voltage of the same polarity and pulses of the voltage of the opposite polarity.

11. The electron-emitting device manufacturing method according to claim 1, wherein a total application time of the voltage of the positive polarity in the voltage application step is not less than 500 $\mu$sec.

12. The electron-emitting device manufacturing method according to claim 1, wherein a total application time of the voltage of the opposite polarity in the voltage application step is not more than a total application time of the voltage of the positive polarity.

13. A method of manufacturing an electron-emitting device which has at least two electrodes and emits electrons by applying a voltage between the at least two electrodes, the method comprising the steps of:

a voltage application step of applying a voltage between the at least two electrodes of the electron-emitting device, said voltage application step including applying a voltage of the same polarity as a polarity of a voltage applied in normal driving, and applying a voltage of an opposite polarity to the polarity of the voltage applied in normal driving, wherein a magnitude of the voltage of the opposite polarity is smaller than a magnitude of the voltage of the same polarity.

14. A method of manufactunrng an electron-emitting device which has at least two electrodes and emits electrons by applying a voltage between the at least two electrodes, the method comprising the steps of:

a voltage application step of applying a voltage between the at least two electrodes of the electron-emitting device, said voltage application step including applying a voltage of the same polarity as a polarity of a voltage applied in normal driving, and applying a voltage of an opposite polarity to the polarity of the voltage applied in normal driving, wherein the voltage application step is performed in a high-vacuum atmosphere.

15. A method of manufacturing an electron-emitting device which has at least two electrodes and emits electrons by applying a voltage between the at least two electrodes, the method comprising the steps of:

a voltage application step of applying a voltage between the at least two electrodes of the electron-emitting device, said voltage application step including applying a voltage of the same polarity as a polarity of a voltage applied in normal driving, and applying a voltage of an opposite polarity to the polarity of the voltage applied in normal driving, wherein the at least two electrodes have a gap therebetween, and the voltage application step is performed in an atmosphere in which the gap between the at least two electrodes is not made narrow by deposition of a substance in the atmosphere or a substance originating from the substance in the atmosphere in said voltage application step.

16. A method of manufacturing an electron-emitting device which has at least two electrodes and emits electrons by applying a voltage between the at least two electrodes, the method comprising the steps of;

a voltage application step of applying a voltage between the at least two electrodes of the electron-emitting device, said voltage application step including applying a voltage of the same polarity as a polarity or a voltage applied in normal driving, and applying a voltage of an opposite polarity to the polarity of the voltage applied in normal driving, wherein the voltage application step is performed in substantially the same atmosphere as in normal driving.

17. A method of manufacturing an electron-emitting device which has at least two electrodes and emits electrons by applying a voltage between the at least two electrodes, the method comprising the steps of:

a voltage application step of applying a voltage between the at least two electrodes constituting the electron-emitting device, said voltage application step including applying a voltage of the same polarity as a polarity of a voltage applied in normal driving, and applying a voltage of an opposite polarity to the polarity of the voltage applied in normal driving, wherein a total application time of the voltage of the positive polarity in the voltage application step is not more than 60 sec.

18. A method of using an electron-emitting device manufacturing apparatus for manufacturing an electron-emitting device which has at least two electrodes and emits electrons by applying a voltage between the at least two electrodes, the method comprising a voltage application step of applying a voltage between the at least two electrodes of the electron-emitting device, the voltage application step including applying a voltage of the same polarity as a polarity of a voltage applied in normal driving, and applying a voltage of an opposite polarity to the polarity of the voltage applied in normal driving, wherein the voltage application step is performed in an atmosphere in which carbon and a carbon compound in the atmosphere have a partial pressure of not more than $1\times10^{-6}$ Pa, said electron-emitting device manufacturing apparatus comprising a potential output portion for applying a voltage between the at least two electrodes.

19. A method of driving an electron-emitting device which has at least two electrodes and emits electrons by applying a voltage between the at least two electrodes, wherein the electron-emitting device is manufactured or adjusted through a voltage application step of applying voltages of opposite polarities between the at least two electrodes of the electron-emitting device, wherein the method comprises applying, in driving, a voltage of one polarity among the voltages of opposite polarities between the at least two electrodes to perform normal driving, and said applying step is performed in an atmosphere in which carbon and a carbon compound in the atmosphere have a partial pressure of not more than $1\times10^{-6}$ Pa.

20. A method of adjusting an electron-emitting device which has at least two electrodes and emits electrons by applying a voltage between the two electrodes, the method comprising the steps of:

a voltage application step of applying a voltage between the two electrodes of the electron-emitting device, said voltage application step including applying a voltage of the same polarity as a polarity of a voltage applied in normal driving, and applying a voltage of an opposite polarity to the polarity of the voltage applied in normal driving, wherein said voltage application step is performed in an atmosphere in which carbon and a carbon compound in the atmosphere have a partial pressure of not more than $1\times10^{-6}$ Pa.

* * * * *

UNITED STATES PATENT AND TRADEMARK OFFICE
CERTIFICATE OF CORRECTION

PATENT NO.    : 6,490,433 B1
DATED         : December 3, 2002
INVENTOR(S)   : Hisaaki Kawade It is certified that error appears in the above-identified patent and that said Letters Patent is hereby corrected as shown below:

Title page,
Item [56], OTHER PUBLICATIONS,
"1997. pp." should read -- 1997, pp. --.

Column 7,
Lines 10 and 17, "current Te" should read -- current Ie --.

Column 14,
Line 35, "T1" should read -- Ti --.

Column 18,
Line 40, "manufactunrng" should read -- manufacturing --.

Column 19,
Line 10, "or a" should read -- of a --.

Signed and Sealed this

Sixteenth Day of September, 2003

JAMES E. ROGAN
*Director of the United States Patent and Trademark Office*